Patented Sept. 19, 1950

2,522,589

UNITED STATES PATENT OFFICE 2,522,589

PHOTOCHEMICAL REACTION OF UNSATURATED ETHERS WITH HYDROGEN SULFIDE

William E. Vaughan and Frederick F. Rust, Berkeley Calif., assignors to Shell Development Company, San Francisco, Calif., a corporation of Delaware No Drawing. Application March 28, 1945, Serial No. 585,388

4 Claims. (Cl. 204—158)

The present invention relates to a process for the preparation of certain organic sulfur-containing compounds, some of which are novel. More particularly, the invention pertains to a novel process for the interaction of hydrogen sulfide with unsaturated, symmetrical or unsymmetrical ethers. The word "ether," as employed herein and in the appended claims, refers both to the oxy-ethers and to the thio-ethers. In one of its more specific embodiments the invention covers the preparation of polyethers by reacting hydrogen sulfide with symmetrical or unsymmetrical oxyethers or thioethers containing unsaturated linkages of aliphatic character in each of the radicals attached to the ether oxygen atom or to the thioether sulfur atom. The invention is also directed to a novel method of effecting a controlled reaction between hydrogen sulfide and oxyethers in which each of the organic radicals attached to the ether oxygen atom contains at least one saturated linkage of aliphatic character, i. e. a double or triple bond, which is preferably between the carbon atom farthest removed from the ether oxygen atom, to produce novel addition products of a predetermined character. The invention also includes a certain novel class of linear polyethers which may be defined as having recurring structural units of the general formula

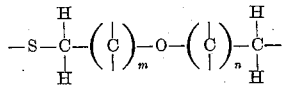

in which $m$ and $n$ are integers.

This application is a continuation in part of our pending patent application Serial No. 385,701, filed March 28, 1941, now Patent 2,398,479.

It is known that mercaptans and thioethers may be produced by subjecting mixtures of hydrogen sulfide and unsaturated hydrocarbons to elevated temperatures in the neighborhood of from 200° C. to 750° C. In some instances, such reactions were effected at superatmospheric pressures. When the reactions are effected at such temperatures and pressures, the sulfhydryl group attaches to the unsaturated carbon atom containing the lesser number of hydrogen atoms linked thereto. In other words, as set forth by Jones and Reid, Jour. Amer. Chem. Soc., vol. 60, pp. 2452-2455, the addition takes place according to Markownikoff's rule. Therefore, when terminally unsaturated olefins are thus reacted with hydrogen sulfide, the reaction product predominates in secondary mercaptans and/or secondary thioethers.

It has now been discovered that unsaturated ethers of the class more fully described hereinbelow may be reacted with hydrogen sulfide to effect rapid, efficient and directional conversion to certain mercaptans and/or polyethers. This conversion occurs via the so-called "abnormal" addition, i. e. contrary to the course suggested by the Markownikoff rule. According to the process of the present invention, the abnormal addition of hydrogen sulfide to the unsaturated ethers may be effected in the absence of free oxygen, air, ozone or peroxides and, in fact, in the absence of any compound or substance the presence of which was heretofore considered necessary for promoting, sensitizing or catalyzing the mentioned abnormal addition of hydrogen sulfide to unsaturated hydrocarbons. Also, contrary to the teachings of the prior art, such interaction of hydrogen sulfide with the unsaturated ethers may be effected without the necessity of resorting to high temperatures and elevated pressures heretofore deemed essential to promote or effect the desired reaction between unsaturated hydrocarbons and hydrogen sulfide.

Broadly stated, the process of the present invention resides in the photochemical addition of hydrogen sulfide to unsaturated oxyethers or thioethers under the deliberate influence of ultraviolet radiations, this reaction being effected without the necessity of applying heat, and being preferably realized at normal temperatures, i. e. in the neighborhood of from about 25° C. to about 15° C., or even at considerably lower temperatures. More particularly stated, the reaction is effected under the influence of light rays having wave-lengths below about 2900 to 3000 Angstrom units. It has been still further discovered that these light rays strongly catalyze the photochemical addition of hydrogen sulfide, this reaction being preponderantly, if not wholly, contrary to the course suggested by Markownikoff for the addition of hydrogen halides, and in accordance with the rule proposed by Posner [Berichte, 38, 646 (1904)] concerning the addition of mercaptans to double bonds, namely that the sulfur of the mercapto group normally becomes attached to the carbon atom carrying the most hydrogen atoms. Therefore, the photochemical reaction taking place under the deliberate influence of ultraviolet radiations offers a direct method for obtaining primary mercaptans and/or primary polyethers from oxyethers, thioethers or oxy-thioethers containing a terminally unsaturated carbon atom.

The process of the invention is applicable to the reaction of hydrogen sulfide with any ether (i. e. oxy- and/or thioether) which contains one or more olefinic and/or acetylenic linkages. In other words, any ether containing one or more unsaturated linkages between two carbon atoms of aliphatic character may be reacted with hydrogen sulfide in accordance with the process of the present invention.

One group of such unsaturated ethers comprises the aliphatic oxyethers in which only one of the aliphatic radicals attached to the ether oxygen atom contains an unsaturated linkage. Examples of such ethers are ethyl vinyl ether, ethyl propenyl ether, methyl isopropenyl ether, ethyl isopropenyl ether, methyl allyl ether, ethyl allyl ether, n-propyl allyl ether, isopropyl allyl ether, 4-ethoxy-butene-1, 6-ethoxy-hexene-1, gamma-ethoxy-alphabutylene, methyl propargyl ether, ethyl propargyl ether, etc., and their homologs and analogs. The above unsaturated ethers and their various homologs may be substituted by straight-chain, cyclic and/or heterocyclic radicals, as well as by halogens. The following are examples of such halogenated unsaturated ethers which may be reacted with hydrogen sulfide in accordance with the process of the present invention: ethyl alpha-chlorovinyl ether, ethyl beta-chlorovinyl ether, ethyl alpha,beta-dichlorovinyl ether, methyl beta,beta-dichlorovinyl ether, ethyl beta,beta-dichlorovinyl ether, ethyl beta,beta-dibromovinyl ether, 2-methoxy-3,3-dichloropropene-1, 2-ethoxy-3,3-dichloropropene-1, 2-propyloxy-3,3-dichloropropene-1, ethyl gamma-chloroallyl ether, methyl gamma-bromoallyl ether, ethyl beta,gamma-dibromo-allyl ether, and their homologs and analogs.

Another group of suitable unsaturated ethers which may be employed as a starting material comprises the aliphatic thioethers in which only one of the radicals attached to the thioether sulfur atom contains an unsaturated linkage. Examples of this group are: ethyl vinyl sulfide, ethyl isopropenyl sulfide, and the like, and their homologs and analogs, as well as suitable substitution products.

Still another group of ethers which may be employed as the primary material comprises or includes the aliphatic oxyethers in which both radicals attached to the ether oxygen atom contain unsaturated olefinic and/or acetylenic linkages. The following are illustrative examples of such poly-unsaturated oxyethers: divinyl ether, diisopropenyl ether, diallyl ether, dicrotyl ether, dimethallyl ether, di(alpha-methyl-allyl) ether, (butene-1-yl-3) (butene-2-yl-1) ether, di(pentene-2-yl-4) ether, dihexenyl ethers, allyl(2-methyl-pentene-4-yl-2) ether, allyl linallyl ether, etc., and their homologs, analogs and suitable substitution products, such as the halogenated derivatives of the type of hexachlorodivinyl ether, di(beta-bromoallyl) ether, di(beta,gamma-diiodoallyl) ether, and the like. Also, the corresponding thioethers in which each radical attached to the sulfur atom contains an unsaturated linkage between two carbon atoms of aliphatic character may be reacted with hydrogen sulfide in accordance with the process of the present invention. The following are illustrative examples of this group of thioethers: divinyl sulfide, di(betachlorovinyl) thioether, diallyl sulfide, dicrotyl sulfide, dimethallyl sulfide, dihexenyl sulfides, and the like, and their homologs and analogs.

The ethers employed as the starting material may also contain more than one ether oxygen atom and/or thioether sulfur atom, this group of unsaturated ethers being represented by compounds of the type of 1,2-bis(vinyloxy) ethane, 1,3-bis(vinyloxy) propane, 1,2-bis(allyloxy) ethane, and the like, as well as by unsaturated disulfides, e. g. divinyl disulfide.

The invention is particularly applicable to the reaction of hydrogen sulfide with unsaturated ethers (i. e. oxyethers and thioethers) in which one or both radicals attached to the oxygen or sulfur atom have a terminal aliphatic unsaturated linkage. When such unsaturates are reacted with hydrogen sulfide in accordance with the process of the present invention, i. e. photochemically and under the influence of ultraviolet radiations, the reaction product predominates in or consists of primary mercaptans and/or primary thioethers.

As stated, a group of unsaturated ethers which may be employed as the primary material comprises or includes the aliphatic oxyethers or thioethers (and their products of substitution) which contain unsaturated linkages in alpha and omega positions, i. e. in terminal positions in each of the radicals attached to the ether oxygen (or sulfur) atom. Because of the fact that the addition of hydrogen sulfide to unsaturated organic compounds, when effected photochemically and under the influence of ultravoilet radiations, is via the so-called "abnormal" addition discussed above, the sulfhydryl radicals will attach to the terminal carbon atoms which carry the greatest number of hydrogen atoms. When each of the radicals of the ether contains a terminal double or triple bond, the treatment of such ethers with hydrogen sulfide in accordance with the process of the present invention will form a reaction product containing primary dimercaptans. These in turn react with additional molecules of the polyunsaturated ether to produce primary ethers possessing a high molecular weight. For instance, diallyl ether may be reacted with hydrogen sulfide to produce high molecular weight compounds which contain both ether oxygen atoms and thioether sulfur atoms in the chain. Instead of employing aliphatic straight-chain polyunsaturated ethers, it is also possible to use branched chain ethers as well as ethers containing alicyclic, aryl, aralkyl and similar radicals, which may or may not be further substituted, e. g. halogenated, provided such ethers contain at least one unsaturated linkage between two carbon atoms of aliphatic character. In order to produce the above-mentioned high molecular weight addition compounds, the unsaturated ethers to be treated in accordance with the process of this invention should have at least one such unsaturated linkage of aliphatic character in each of the radicals attached to the ether oxygen atom (in the case of oxyethers) or to the thioether sulfur atom (when the starting material is a thioether). However, other polyunsaturated ethers may also be used to produce branched chain polyethers having high molecular weights.

The reaction of hydrogen sulfide with the above-defined class of unsaturated ethers under the influence of ultra-violet radiations may be effected in the vapor phase, in the liquid phase, or in a two-phase liquid-vapor system. Since the abnormal addition of hydrogen sulfide according to the present process occurs photochemically, no heating is necessary. In fact, and in view of the exothermic character of the addition reaction, resort to cooling is frequently advisable, if not essential. The reaction may be realized at atmospheric temperatures (i. e. between about 15° C. and about 25° C.), or at somewhat higher temperatures. It may frequently be effected at temperatures as low as 0° C. and lower.

The photochemical reaction may be effected at any pressure. However, it is generally preferable to employ superatmospheric pressures which are at least sufficient to maintain the reactants, or at least the unsaturated ether, in the liquid state. This is because the conversion rate appears to be accelerated when the reaction is effected in the liquid state.

The effective wave-lengths of ultra-violet light which promote the desired "abnormal" addition of hydrogen sulfide appear to lie in that portion of the spectrum which is below about 3200 Angstrom units, and more particularly in the region of about 2900 Angstrom units and below. In fact, the interposing of an ordinary window glass filter (which has a lower limit of transmission of about 3300 Angstrom units) or of a Pyrex glass filter having a lower transmission limit of about 2900 to 3000 Angstrom units, in the path of light coming from a source emitting ultra-violet radiations will cause a substantially complete inhibition of the reaction unless some sensitizer, such as organic peroxides or ketones, is added. On the other hand, the use of quartz vessels for the reaction according to the process of the present invention allows efficient addition of hydrogen sulfide due to the fact that quartz transmits ultra-violet rays considerably below 2900 Angstrom units.

The addition reaction between hydrogen sulfide and the unsaturated ethers occurs very rapidly when effected under the influence of ultra-violet rays, particularly when relatively low-boiling unsaturated ethers, such as the low-boiling mono- or polyunsaturated oxyethers, are thus treated in the liquid phase and when low wave-lengths of about 2900 A. U. and below are employed. In some cases, however, there is an initial induction period during which no or substantially no reaction occurs. This is particularly true when vapor phase reactions are effected, especially in the presence of certain impurities which affect adversely the reaction rate. The length of the induction period, if such occurs, varies depending on a number of conditions, such as the specific unsaturated ether employed, presence or absence of a liquid phase, concentration of the reactants in the reaction zone, presence or absence of impurities and/or added surfaces in the reaction zone, etc. Also, other conditions being equal, a change in the intensity of the effective wave-lengths of the ultra-violet radiations will vary the rate of the "abnormal" addition of the hydrogen sulfide and, in the case of the reaction of hydrogen sulfide with polyunsaturated ethers, the molecular weight of the resultant polyethers, i. e. the degree of addition attained.

The reaction may be effected in a batch, intermittent or continuous manner. When effected by the batch method, the reactants may be introduced into a suitable container which is then illuminated with ultra-violet light for a period of time sufficient to effect the desired degree of addition reaction. Since ordinary glass or Pyrex glass will not permit any substantial transmission of the effective light waves, viz. those in the neighborhood of 2900 to 3000 Angstrom units and below, it is preferable to construct the container of quartz or other suitable light transmitting materials, e. g. calcium fluoride, or at least to provide such container with an opening or window of quartz, calcium fluoride, or the like, through which the interior may be illuminated with ultra-violet rays. In case of a continuous process the reactants, viz. hydrogen sulfide and the unsaturated ether, such as the aliphatic oxyethers in which each of the aliphatic radicals attached to the ether oxygen atom contains a terminally-positioned double bond, may be conveyed, either in a liquid or vapor state, or both, through the interior of a reaction chamber. This latter may be of sufficient length so as to permit adequate residence time for the reactants. The reactants in the reaction chamber are then subjected to ultra-violet radiations emanating from a source or sources disposed within or without the chamber. In the former case, the reactor may be constructed of steel or the like, the source of the ultra-violet radiations being disposed in the path of the moving reactants. Instead of introducing both of the reactants together, it is also possible to convey one of the reactants, for example the unsaturated ether, through the whole length of the reactor tube, while feeding in the other reactant, e. g. hydrogen sulfide, either in the liquid or the vapor state, at various intermediate points. This permits control of the reaction temperature and of the concentration of the reactants in the reaction zone. The discharged reaction products may be treated by any known or suitable means or methods for the separation and recovery of the desired addition and/or polyaddition products.

The addition reaction between hydrogen sulfide and the oxyethers in which each of the radicals attached to the ether oxygen atom contains an unsaturated linkage between the carbon atoms farthest removed from the oxygen atom results in the formation of novel and valuable compounds which may be generally represented by the formula

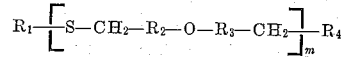

wherein $R_2$ and $R_3$ represent like or different non-aromatic, substituted or unsubstituted hydrocarbon radicals, $m$ is an integer, $R_1$ represents the hydrogen atom or the radical $-CH_2-R_5-O-R_6=CH_2$, and $R_4$ represents the sulfhydryl radical or the radical

wherein $R_5$ through $R_8$ represent like or different non-aromatic, substituted or unsubstituted hydrocarbon radicals.

A useful class of novel compounds which may be prepared according to the process of the present invention comprises the linear polyethers which may be defined as having recurring structural units of the general formula

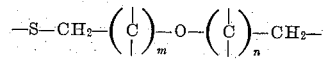

in which $m$ and $n$ are integers. The terminal sulfur atom of such linear polyethers is satisfied either by the hydrogen atom or by an alkenoxy radical attached to the sulfur atom via a primary carbon atom, while the other end of such linear polyether is terminated by the sulfhydryl radical or by a radical having the general formula

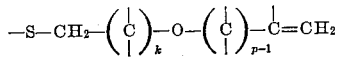

wherein $k$ and $p$ are integers.

A particularly useful subclass of the novel compounds comprises the linear polyethers which may be defined as having recurring structural units of the general formula

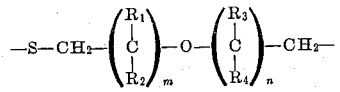

in which $m$ and $n$ are integers and $R_1$ through $R_4$ each represent the hydrogen atom, a halogen atom, or an alkyl, preferably lower alkyl, radical, e. g. methyl, ethyl, propyl, etc. radical. The products formed in accordance with the process of the present invention by the interaction of divinyl ether with hydrogen sulfide may be considered as specific examples of polyethers of this subclass. Depending on the degree of addition reaction, the products formed by the interaction of hydrogen sulfide with divinyl ether (in accordance with the process of this invention) will predominate in or consist of the following addition products:

HS—(CH₂)₂—O—(CH₂)₂—SH
HS—(CH₂)₂—O—(CH₂)₂—S—(CH₂)₂—
 O—CH=CH₂
CH₂=CH—O—(CH₂)₂—S—(CH₂)₂—O—
 (CH₂)₂—S—(CH₂)₂—O—CH=CH₂
CH₂=CH—O—(CH₂)₂—S—(CH₂)₂—O—
 (CH₂)₂—S—(CH₂)₂—O—(CH₂)₂—SH
HS—(CH₂)₂—O—(CH₂)₂—S—(CH₂)₂—O—
 (CH₂)₂—S—(CH₂)₂—O—(CH₂)₂—SH etc.

This group of compounds may be exemplified by the general formula

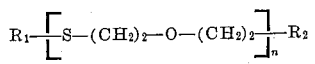

wherein $n$ is an integer, $R_1$ represents the hydrogen atom or the radical

—(CH₂)₂—O—CH=CH₂ and $R_2$ represents the sulfhydryl radical or the radical —S—(CH₂)₂—O—CH=CH₂. Similarly, the polyethers formed by the reaction of diallyl ether with hydrogen sulfide have the general formula

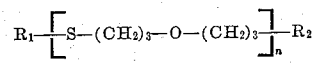

wherein $n$ is an integer, $R_1$ represents the hydrogen atom or the radical

—(CH₂)₃—O—CH₂—CH=CH₂ and $R_2$ represents the sulfhydryl radical or the radical —S—(CH₂)₃—O—CH₂—CH=CH₂.

It is to be noted that in all of the novel compounds defined herein the thioether sulfur atom is attached to two carbon atoms both of which are of primary character. Also, the sulfhydryl radical, if such is present at one or both ends of the linear polyether compound, is always attached to a primary carbon atom.

Depending on their molecular weights (and, to some degree, on the starting unsaturated oxyethers employed), the novel class of polyethers range from compounds (or mixtures of such compounds) which are very fluid, through those which are oleaginous or viscous, and to compounds which are wax-like solids. The properties possessed by these novel polyether compounds adapt them admirably for various uses. They are exceptionally well suited as a synthetic lubricating oil, synthetic lubricating grease, or as a coating or impregnating material alone or in solution together with solvents and/or other compounding agents. They are also satisfactory as blending agents in lubricants (e. g. mineral lubricants) including greases, as plasticizers, hydraulic fluids and coolants, as well as ingredients in the manufacture of cosmetics, polishes, soaps, and for many other uses which will be evident from their chemical and physical characteristics. For example, certain of the normally liquid compounds of the above-defined class of novel polyethers (as well as mixtures of such novel polyethers) have molecular weights, pour points, viscosities, viscosity indices and oxidation stabilities which render them exceptionally adaptable for use as synthetic lubricating oils, or at least as ingredients of such oils. On the other hand, the wax-like solid polyethers of the above-defined class of novel compounds may be readily employed as synthetic greases, in the manufacture of cosmetics, etc.

The invention is illustrated by the following specific examples, it being understood that there is no intention of being limited by any details thereof since many variations may be made.

*Example I*

Equimolar quantities of hydrogen sulfide and diallyl ether were introduced in the liquid state into a quartz bomb tube which was sealed under a high vacuum. The tube was then warmed to about 0° C., disposed in a quartz container packed with ice, and subjected to illumination from a 400-watt quartz mercury arc lamp disposed at a distance of about 6 inches from the bomb. The irradiation was continued for about eighty minutes. The volume of the solution in the bomb decreased about 15%, most of this contraction occurring during the first 20 minutes of irradiation. The reaction product was a water-white liquid which was distilled to a temperature of about 235° C. under a pressure of about 2.3 cm. (absolute) to separate the relatively lighter boiling constituents, which amounted to about 8% by weight of the total, had a boiling temperature of about 85° C., and a strong mercaptan odor. The residual fraction remaining from the aforesaid distillation was found to have the following properties:

| | |
|---|---:|
| Molecular weight (cryo. benzene) | 674 |
| Sulfur, per cent by weight | 24.3 |
| Mercaptan, as sulfur, per cent by weight | 5.1 |
| Viscosity Index | 152 |
| Viscosity at 100° F., in centistokes | 66.6 |
| Viscosity at 210° F., in centistokes | 13.26 |
| Viscosity (S. A. E. No.) | Between 20 and 30 |
| Micro pour point, ° C | −45 |
| Yield, per cent by weight | 92 |

From the above and other analyses it appears that this polyaddition product, on the average, has the following structural formula:

CH₂=CH–CH–O-(CH₂)₃-[S-(CH₂)₃-O-(CH₂)₃]₄-SH

This product has a molecular weight of 660, a sulfur content of about 24% by weight, and a mercaptan content (as sulfur) of 4.85% by weight.

Example II

Equimolar amounts of diallyl ether and hydrogen sulfide were subjected to irradiation under substantially the same conditions as those used in the preceding example. After distillation of the relatively lighter constituents, the residual fraction analyzed as follows:

| | |
|---|---|
| Molecular weight (cryo. benzene) | $584 \pm 10$ |
| Mercaptan, as sulfur, per cent weight | 9.2 |
| Micro pour point, °C | $-43$ |
| Viscosity at 100° F., in centistokes | 52.0 |
| Viscosity at 210° F., in centistokes | 10.17 |
| Viscosity Index | 152 |
| Density, $D_4^{20}$ | 1.0766 |
| Sulfur, per cent by weight | 24.1 |

From the above and other analyses it appears that this residual polyether product has the following average structure:

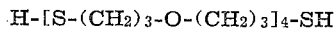

$$H-[S-(CH_2)_3-O-(CH_2)_3]_4-SH$$

The difference in the results obtained in Examples I and II give an indication as to the variations obtainable in the product by changes in the operating conditions.

Example III

Equimolar amounts of liquefied hydrogen sulfide and dimethallyl ether were introduced into a quartz bomb and irradiated with light emanating from a quartz mercury arc lamp under the same conditions as those employed in Example I. The reaction was continued for about 2 hours. The reaction product was then heated to 240° C. at a pressure of about 2 cm. (absolute). This caused the distillation of about 17% of the total product. An analysis of the remaining fraction gave the following results:

| | |
|---|---|
| Molecular weight (cryo. benzene) | 661 |
| Sulfur, weight per cent | 23.1 |
| Mercaptan, as sulfur, weight per cent | 7.8 |
| Micro pour point, °C | $-35$ |
| Viscosity at 100° F., in centistokes | 62.71 |
| Viscosity at 210° F., in centistokes | 10.01 |
| Viscosity Index | 136 |
| Viscosity (S. A. E. No.) | 20 |
| Yield, weight per cent | 83 |

From the above, it appears that this methallyl ether-hydrogen sulfide addition product has the following average structure:

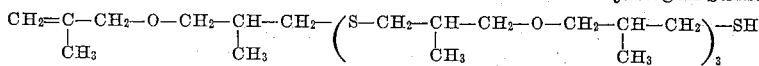

Example IV

Substantially equimolar amounts of liquefied hydrogen sulfide and divinyl ether were introduced into an evacuated quartz bomb tube which was then sealed and disposed in a quartz container packed with ice. The reactants in the tube were then subjected to illumination from a 400-watt quartz mercury arc lamp disposed at a distance of about 6 inches from the bomb. The reaction preceeded very rapidly, the volume of the solution in the bomb decreasing by about 30% after three minutes of irradiation. At the end of about 7 minutes, a white, semi-solid material began to form near the bottom of the reactor. The irradiation was continued for a total period of 10 minutes, at the end of which the reaction mixture was heated to 240° C. at a pressure of about 2 cm. (absolute), resulting in the distillation of approximately 7.3% of the mixture. The residual fraction, upon standing for a few hours, became a white, somewhat greasy solid which was found to have the following properties:

| | |
|---|---|
| Molecular weight (cryo. benzene) | 1000 to 1100 |
| Sulfur, weight per cent | 32.1 |
| Mercaptan, as sulfur, weight per cent | 4.3 |
| Micro pour point, °C | 25 to 50 |
| Viscosity Index | 129 |
| Yield, weight per cent | 93 |

Example V

In order to determine the effect of the molar ratio of the unsaturated ether to hydrogen sulfide on the polyether composition, four solutions of diallyl ether and hydrogen sulfide, in which the mole ratios of the ether to the hydrogen sulfide were 0.5:1, 1:1, 2:1 and 4:1, respectively, were prepared, and each solution was then subjected for a period of one hour to irradiation with ultra-violet rays with the lamp and under the conditions described in Example I. Thereafter the reaction products from each of the four runs were separately distilled to recover two fractions, viz. one (Fraction A) distilling between 200° C. at about 13 cm. of Hg pressure (absolute) and 240° C. at about 1 cm. pressure, and the second (Fraction B) boiling above said last-mentioned temperature and pressure. These fractions were then separately analyzed. The following two tables present the properties of these fractions:

Fraction A

| Mole Ratios Used | 0.5:1 | 2:1 | 4:1 |
|---|---|---|---|
| Molecular weight (cryo.benzene) | 188 | 212 | 218 |
| Sulfur, weight percent | 30.9 | 15.1 | 14.0 |
| Mercaptan, as sulfur, weight percent | 26.2 | 0.2 | <0.02 |
| Viscosity Index | 136 | 108 | 98 |
| Yield, weight percent | 50 | 34 | 36 |

Fraction B

| Mole Ratios Used | 0.5:1 | 1:1 | 2:1 | 4:1 |
|---|---|---|---|---|
| Molecular weight (cryo. benzene) | 488 | 674 | 408 | 346 |
| Sulfur, weight percent | 26.9 | 24.8 | 18.9 | 17.2 |
| Mercaptan, as sulfur, weight percent | 8.0 | 5.1 | 0.05 | <0.02 |
| Viscosity Index | 152 | 152 | 161 | 162 |
| Yield, weight percent | 50 | 92 | 55 | 18 |

A comparison of the above results indicates that changing the mole ratio of the ether to the hydrogen sulfide has but little effect on the properties of the polyether fraction boiling above 240° C. at 1 cm. pressure (absolute). However, the yield of this fraction rises to a maximum at a reactant ratio of about 1:1.

Example VI

Three separate runs were conducted in each of which equimolar amounts of diallyl ether and hydrogen sulfide were placed in the liquid state in a quartz reaction tube which was thereafter sealed, placed in ice bath, and irradiated with light emanating from a quartz mercury arc lamp. The contents of the first tube were thus illuminated for a period of 5 minutes, while the illuminations of the second and third tubes were conducted for 10 minutes and 2 hours, respectively. The reaction mixtures obtained in each of the tubes were then separately distilled in the following manner: The reaction mixture was first heated at atmospheric pressures to a temperature of 200° C. The distillate thus produced constituted Fraction I. The residue was then again heated but at a pressure of about 13 cm. (absolute). The distillate thus produced constituted Fraction II. The residue from the second distillation was reheated to 240° C. at about 1 cm. pressure to produce an overhead Fraction III, while the residue constituted Fraction IV. The yields of the various fractions thus produced, as well as their refractive indices, are presented in the following table:

| Illumination Time, Minutes | Fraction | | | | | | | |
|---|---|---|---|---|---|---|---|---|
| | 1 | | 2 | | 3 | | 4 | |
| | N-20/D | Percent w | N-20/D | Percent w | N-20/D | Percent w | N-20/D | Percent w |
| 5 | 1.4210 | 10.0 | 1.4681 | 6.0 | 1.4980 | 48.0 | 1.5163 | 34.0 |
| 10 | | | 1.4340 | 5.0 | 1.4918 | 20.2 | 1.5212 | 64.7 |
| 120 | | | | | | 11.0 | | 89.0 |

*Example VII*

The apparatus employed in this run consisted of a 500 cc. 3-neck flask equipped with a condenser, a quartz thimble holding a 100-watt mercury arc lamp projecting downwardly from the center neck to a point about 0.5 cm. above a sintered glass bubbler built into the bottom of the flask. Approximately 180 cc. of divinyl ether were introduced into the flask, which was maintained at a temperature of about 0° C. The contents of the flask were then illuminated with the above-mentioned lamp and approximately 0.28 moles of hydrogen sulfide were bubbled into the liquid divinyl ether at a rate of approximately 220 cc. per minute. About 15 minutes after the starting of the run a small amount of a white solid began to form on the walls of the flask. At the end of the run the reaction mixture was distilled. After removal of the unreacted divinyl ether approximately 30% of the remaining reaction mixture boiled above 240° C. at a pressure of about 1 cm. (absolute). This addition product was a liquid having a viscosity index of 144.

*Example VIII*

Substantially equimolar amounts of diallyl sulfide and hydrogen sulfide were introduced in the liquid state into a quartz reaction tube, the mixture being then subjected to irradiation from a quartz mercury arc lamp. The polythioether compound produced, with respect to color, viscosity and pour point, resembles the addition product obtained by the interaction of diallyl ether with hydrogen sulfide.

*Example IX*

The residual fraction from distilling the products of reaction obtained in Example I, which distillation was conducted under a pressure of about 2.3 cm. absolute to a temperature of about 235° C., was tested for its extreme pressure lubricating properties. This was determined by running the residual product in the 4-Ball machine described in "Engineering," vol. 136 (1933), p. 46, for 2 hours at 7 kg. load and at a temperature of 130° C. The scar diameters on the top balls were then measured and found to be equal to 0.33 mm., thus indicating the exceptionally low wear and friction characteristics of the product.

The same residual fraction was also tested to determine its oxidation resistance stability. The test employed was that described in Ind. Eng. Chem. 34, pp. 185 et seq. (1942). The oxidation time was found to be 5.1 hours.

The high-temperature oxidation stability of the above polyether fraction was also tested by the so-called "Lacquer-Plate" Test described on pages 85 and 87 of the "Papers Presented before the Petroleum Division of the American Chemical Society—Symposium on Bench Scale Techniques," September 11–15, 1944, New York, New York. According to this method, and operating at a temperature of 180° C., the total residue was found to be 87% by weight, while the acetone-insoluble portion of this residue was 1.4% by weight.

The oxidation stability may be increased materially by the elimination of the terminal olefinic double bond and/or of the terminal group. Also, anti-oxidants may be added to improve the stability.

*Example X*

Diallyl ether and hydrogen sulfide (used in a volumetric ratio of 2:1) were mixed in an evacuated quartz tube, the mixture being then subjected, for a period of 15 minutes and at a temperature of from 0° C. to 10° C., to light emanating from a quartz mercury arc lamp. The liquid reaction product had a molecular weight of 285, and approximately 25.9% by weight of sulfur.

*Example XI*

When hydrogen sulfide is reacted with 1,2-bis(divinyloxy) ethane under the deliberate influence of ultra-violet radiations of below about 2900 to 3000 Angstrom units, the reaction product contains high molecular weight addition products having recurring structural units of the general formula

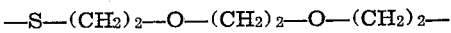

$$-S-(CH_2)_2-O-(CH_2)_2-O-(CH_2)_2-$$

We claim as our invention:

1. In a process for the production of an unsaturated linear polymer, the steps comprising subjecting diallyl ether and hydrogen sulfide, mixed in a molar proportion of from 1 to 4 moles of ether per mole of hydrogen sulfide and maintained in the liquid phase, to light radiations having wave lengths below 3000 Angstrom units until products boiling above 240° C. at 1 cm. pressure are produced, and recovering such products.

2. In a process for the production of an unsaturated linear polymer, the steps comprising subjecting divinyl ether and hydrogen sulfide, mixed in a molar proportion of from 1 to 4 moles of ether per mole of hydrogen sulfide and maintained in the liquid phase, to light radiations having wave lengths below 3000 Angstrom units until products boiling above 240° C. at 1 cm. pressure are produced, and recovering such products.

3. In a process for the production of an unsaturated linear polymer, the steps comprising subjecting a dialkenyl ether containing both double bonds in the form of terminal $=CH_2$ groups and hydrogen sulfide, mixed in a molar proportion of from 1 to 4 moles of ether per mole of hydrogen sulfide and maintained in the liquid phase, to light radiations having wave lengths below 3000 Angstrom units until products boiling above 240° C. at 1 cm. pressure are produced, and recovering such products.

4. In a process for the production of an unsaturated linear polymer, the steps comprising subjecting hydrogen sulfide and a diolefinically unsaturated aliphatic compound in which the double bonds are contained in two hydrocarbon radicals separated by at least one member of the group consisting of the thio and oxy groups, mixed in molar proportions of from 1 to 4 moles of diolefinic compound per mole of hydrogen sulfide and maintained in the liquid phase, to light radiations having wave lengths below 3000 Angstrom units until products boiling above 240° C. at 1 cm. pressure are produced, and recovering such products.

WILLIAM E. VAUGHAN.
FREDERICK F. RUST.

REFERENCES CITED

The following references are of record in the file of this patent:

UNITED STATES PATENTS

| Number | Name | Date |
|---|---|---|
| 2,118,995 | Waldmann et al. | May 31, 1938 |
| 2,142,145 | Patrick | Jan. 3, 1939 |
| 2,332,165 | Ott | Oct. 19, 1943 |
| 2,392,294 | Rust et al. | Jan. 1, 1946 |
| 2,398,479 | Vaughan et al. | Apr. 16, 1946 |